Patented Feb. 28, 1939

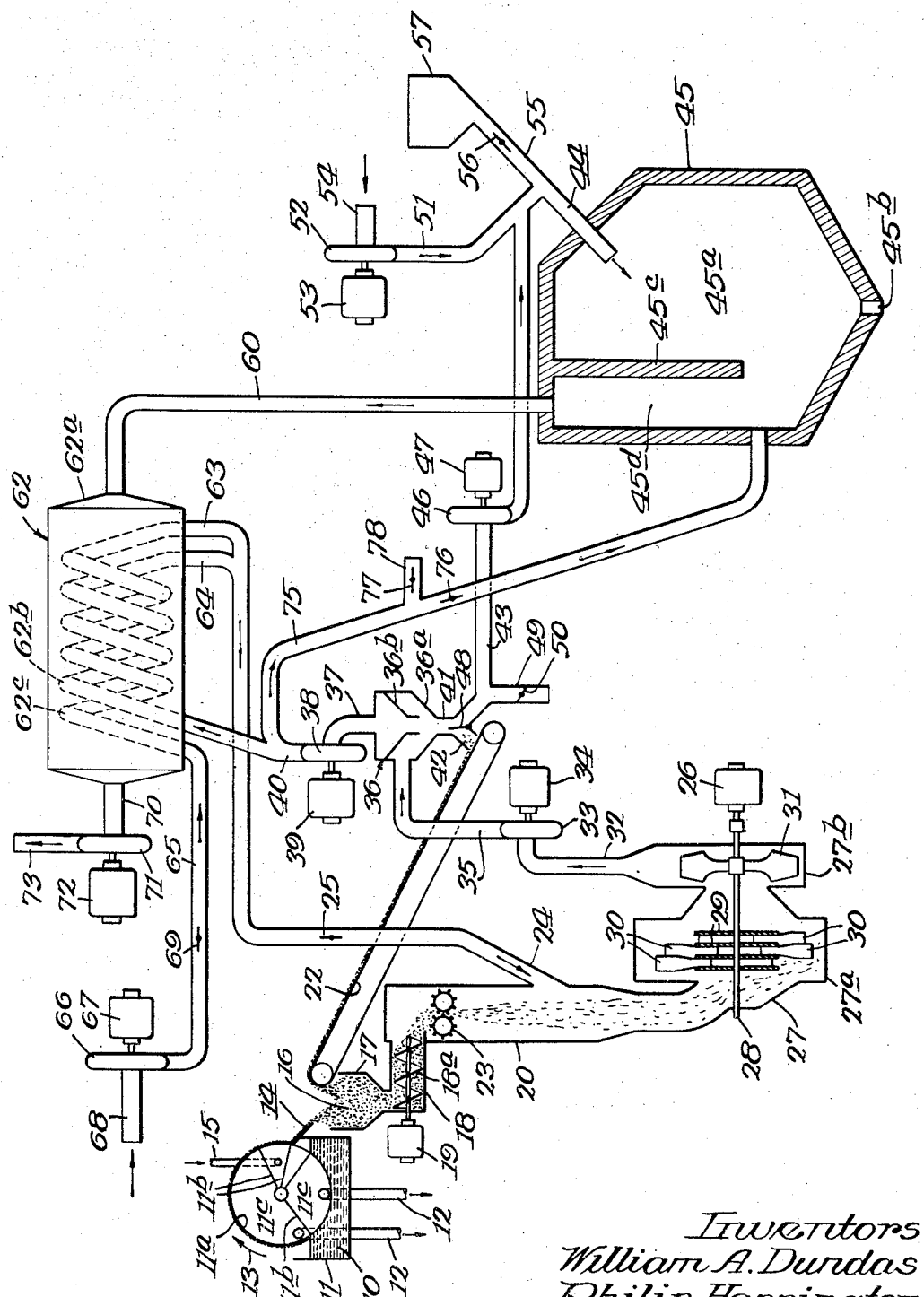

2,148,981

UNITED STATES PATENT OFFICE 2,148,981

METHOD OF AND APPARATUS FOR DISPOSING OF SEWAGE WASTE AND THE LIKE

William A. Dundas, Winnetka, and Philip Harrington, Chicago, Ill.

Application April 8, 1935, Serial No. 15,242

8 Claims. (Cl. 110—15)

This invention relates to improvements in methods of and apparatus for the disposal of sewage wastes and other materials and the present invention is an improvement upon that described and claimed in our co-pending application Serial No. 686,926, filed August 26, 1933, in which there is disclosed an improved method of and apparatus for disposing of sewage waste and the like according to which the waste materials are treated continuously, being subjected to a dewatering step and then being disposed of by incineration, leaving only the inert ash, and the gases of combustion which are preferably utilized in drying the materials prior to the incineration thereof, either by bringing these gases into direct contact with the materials or by utilizing the gases in heating air which is circulated in contact with the materials. Although particularly adapted for the treatment of sewage waste, the invention may be employed in the disposal of garbage, rubbish and other municipal wastes and the like, or mixtures thereof.

Sewage consists of a mixture of water, minerals and other inert inorganic materials and organic materials, either in suspension or solution, and garbage and rubbish are similar in that they usually include mixtures of organic and inorganic materials and water. The problem of sewage disposal involves the separation of the water from the more or less solid ingredients and the disposition of these solid ingredients in an economical manner without creating a nuisance in the region where the operation is carried on. Prior to the development of the invention disclosed in said prior application, the purification and treatment of sewage and the disposal of the waste products of such methods were usually practiced by separating more or less perfectly the water from the other materials contained in the sewage, after which the water was ordinarily run off to open streams or bodies of water and the other separated materials were disposed of in various ways. These waste materials, commonly known as sludge, screenings and grit, consist of the organic and inorganic ingredients of the sewage together with some water which has not been separated by the initial treatment. The organic materials consist mainly of vegetable and animal matter, including a large percentage of volatile and combustible material, while the inorganic materials are largely in the form of inert minerals. These more or less solid ingredients of the sewage were ordinarily disposed of by mechanical dewatering and processing as a fertilizer, for which the market is limited, or by digestion followed by partial dewatering carried on in drying beds and again followed by dumping on waste land, or by partial digestion and evaporation in lagoons, or by dumping the material at sea or in open rivers and lakes. These prior methods of disposal had numerous disadvantages as pointed out in said application, the disposal being uncertain, seasonal and intermittent, dependent upon weather conditions and requiring the use of large areas of land, in addition to which these prior methods did not reduce the organic and inorganic ingredients to an inert form, so that unsanitary conditions were created which gave rise to undesirable odors and nuisances over large areas. These difficulties were overcome by the invention of said application, which provided means for reducing the organic and inorganic materials to an inert form, besides enabling the materials to be disposed of quickly, conveniently and economically with a comparatively small expenditure for apparatus and other equipment and with a total elimination of the nuisance feature.

The principal object of the present invention is to provide an improved method of and apparatus for disposing of sewage waste and the like, according to which the important objects of the invention of said prior application are attained but in a more economical and expeditious manner. According to the present invention, the waste materials, from which the major portion of the water has been removed, are dried, preferably in a comminuted state, by the action of a current of superheated steam which is then separated along with the steam and vapors given off by the material during the drying operation. In the practice of this improved method, it is found that the waste material may be dried, either with or without subsequent incineration, even more efficiently and economically than was possible with the practice of the invention disclosed in said prior application, without odors and without danger of burning or scorching the materials, and also without the danger of producing an explosive mixture. It has further been found that the practice of the present invention may be carried on with a higher temperature in the drying stage of the process and that better combustion of the dried materials is effected in the furnace because it is unnecessary to deodorize an excess of air from the drying process. An important object of the invention is to provide means for comminuting and drying the solid materials in combination with a furnace for burning the dried materials and means for circulating through the materials in the drying stage a current of superheated steam which is circulated continuously in a closed path with provision of means for discharging to the furnace the excess of steam which is developed by the generation of steam in the materials being dried, the heat generated by the combustion of the dried materials in the furnace being utilized in maintaining the superheat of the steam which is employed in the drying step. Other objects relate to various features of the apparatus and to various details of the improved method which will appear more fully hereinafter.

In the drawing, the single figure is a somewhat diagrammatic circuit diagram and cross-sectional view showing the features of one form of the improved apparatus which is employed in practicing the improved process of the present invention.

As illustrated in the drawing, the sewage waste material 10, which may contain from one to twenty per cent by weight of solid matter, after being mixed with a suitable conditioner or coagulant, such as ferric chloride, is introduced into a dewatering apparatus such as the tank of a rotary filter 11 of the vacuum type which comprises a cloth covered cylindrical drum 11ª, partially submerged in the material 10 contained within the tank and mounted for rotation about a horizontal axis. The space within the cylinder 11ª is divided into chambers by radial division walls 11ᵇ and a connection is made with suction pipes 12 so that a partial vacuum may be maintained in each of the chambers 11ᶜ of the drum at certain periods during its rotation in the direction of the arrow 13. This vacuum connection is ordinarily made through the hollow shaft of the drum but is illustrated diagrammatically as being established by suction pipes leading to the separate chambers when these chambers are in certain positions with respect to the tank in which the sewage waste, or other waste, is contained. As the drum rotates through the tank, the suction causes the solid material of the sewage waste to be separated from the water and deposited upon the cylindrical surface of the drum and when one of the chambers is carried above the surface of the fluid by the rotation of the drum, the suction serves to draw the water out of the waste material while at the same time causing it to adhere to the drum until it reaches a point where it engages an inclined scraper blade 14 by which it is removed. At this point, the chamber located within that portion of the cylindrical surface of the drum adjacent the scraper establishes a fluid-tight connection with the air pipe 15 through which air is introduced under pressure into the chamber to assist the blade 14 in removing the solid waste material 16 which then falls by gravity into a hopper 17. If desired, other forms of dewatering apparatus, such as presses, centrifuges and traveling screens may be employed instead of the rotary vacuum filter. A quantity of previously dried waste material, preferably from a succeeding stage of the process, may be introduced into the hopper 17 with the material 16 for the purpose of reducing the moisture content of the mass of material to be treated. In this drawing, this dried material is shown as being discharged into the hopper 17 by a belt conveyor 22 which receives the material at a point beyond the drying stage of the process and returns it to the hopper.

From the bottom of the hopper 17, the wet material (or the mixture of wet and partially dried material) is moved through a conveyor tube 18 having mounted therein a screw conveyor 18ª driven by an electric motor 19. The conveyor tube 18 discharges the material into a vertical drying tower 20 and the incoming material is ground up in the upper part of this tower by suitable apparatus such as a pair of rotary chopping devices 23 comprising rotary drums having radiating blades adapted to mesh with each other during the rotation of the drums in opposite directions by suitable power means not illustrated. The waste materials are thus more or less finely divided and they then drop by gravity through the tower 20 where they mingle with a current of superheated steam, or a mixture of superheated steam and hot air, which is introduced into the drying tower through a conduit 24. This superheated steam may have a temperature of 1000 degrees Fahrenheit or more and the flow of this steam through the supply conduit 24 may be controlled and regulated by a damper 25. The waste material and steam then pass from the bottom of the tower 20 to a pulverizing and grinding mill 27 comprising a main casing 27ª and an auxiliary casing 27ᵇ having a horizontal shaft 28 journaled in the walls thereof. A plurality of disks 29 are secured on the shaft 28 within the main casing 27ª and a series of beater arms 30 are pivotally mounted on these disks so that they fly out by centrifugal force and engage the incoming waste material with the result that this material is comminuted and thereby reduced to a more or less finely divided state. The auxiliary casing 27ᵇ, which is in direct communication with the end of the casing 27ª, preferably contains a fan or impeller 31 which is fixed upon the shaft 28 so that it rotates continuously when the shaft is driven by the electric motor 26. As the waste material is agitated and pulverized in the casing 27ª, the finely divided particles are dried by the high temperature superheated steam which mingles therewith, with the result that additional steam and vapors are given off from these materials to mingle with the superheated steam which thus loses some of its heat during this drying operation. The mixture of finely divided solid material, steam and vapor, is then drawn off and discharged upwardly by the rotating impeller 31 through a conduit 32. This conduit may lead to the intake of a fan 33 which is driven by an electric motor 34 and which discharges the mixture upwardly through a conduit 35 into a centrifugal separating device 36 comprising a cone-shaped lower wall 36ª and a similarly shaped division wall 36ᵇ, each having a central outlet at its lower end or apex. The steam and vapor contained in the mixture which is received through the conduit 35 is drawn upwardly through the division wall 36ᵇ and through a conduit 37 by a fan 38 which is driven by an electric motor 39 and which discharges the mixture of steam and vapor through a conduit 40. The solid matter separated in the centrifugal separator 36 drops by gravity through the central opening of the lower cone-shaped wall 36ª into a conduit 41 from which a portion of the material is ordinarily discharged through a branch conduit 42, onto the belt conveyor 22 to be returned to the hopper 17, while the remainder is conveyed through a conduit 43 to the burner tube 44 of a furnace 45, preferably by the action of a fan 46 connected in the conduit 43 and operated by an electric motor 47. A damper 48 at the juncture of the conduits 42 and 43 may be employed to cut off the flow of dried material to the conveyor 22. The conduit 43 is provided with a branch conduit 49, controlled by a normally closed damper 50 through which dried solid material may be withdrawn for treatment by some process other than by incineration, for example, by processing for fertilizer. A supply of air for supporting combustion of the material conveyed to the burner tube is mingled with the dried material in the burner tube 44 and is furnished thereto through a conduit 51 leading from the outlet of a fan 52 which is driven by an electric motor 53 and which has an air intake conduit 54 connected thereto. Auxiliary fuel, such as powdered coal, may be supplied to the burner tube through a pipe 55, controlled by a damper 56, and fed by a hopper 57.

The dried material discharged into the burner tube 44, with or without an admixture of auxiliary fuel, is burned as it enters the furnace chamber 45ª from the mouth of the burner tube and the resulting ash may be drawn off through the aperture 45ᵇ which is formed at the center of the inverted cone-shaped lower wall of the furnace. A baffle wall 45ᶜ may be arranged to extend downwardly from the top wall of the furnace, forming a flue space 45ᵈ through which the hot gases of combustion pass upwardly to a conduit 60 through which they flow to the casing 62ª of a reheater 62. This reheater contains a helical coil 62ᵇ which is connected to the discharge conduit 40 of the fan 38 so that the steam, vapors and the like which are drawn off from the drying mill 27 are passed through the coil 62ᵇ and heated by the action of the surrounding hot gases from the furnace preliminary to being discharged from the other end of the coil 62ᵇ through the conduit 63 which leads to the conduit 24 by which the superheated steam, or a mixture of superheated steam and air, is discharged into the drying tower 20. In the casing 62ª of the reheater there is another helical coil 62ᶜ having its convolutions arranged to alternate with those of the coil 62ᵇ. This coil 62ᶜ is connected at its discharge end through a conduit 64 with the conduit 24 and at its other end it is connected to an air supply conduit 65 which leads from the discharge outlet of a fan 66 adapted to be driven by a motor 67 and having an air intake conduit 68 through which air is drawn from the atmosphere to be impelled by the fan through the conduit 65 to the reheater. A damper 69 is located in the conduit 65 for regulating or shutting off the flow of air therethrough. The hot gases of combustion passing through the casing 62ª of the reheater are discharged through a conduit 70 to a fan 71 which is driven by an electric motor 72 and which discharges the gases upwardly through a conduit 73 which may lead to a stack through which the gases are wasted to the atmosphere.

When the apparatus is initially started in operation, air is introduced to the coil 62ᶜ of the reheater through the conduit 65 and assuming that a fire is initially maintained in the furnace, by burning auxiliary fuel from the hopper 57, to supply heated gases to the reheater, the air in the coil 62ᶜ is then highly heated and flows through the conduit 24 to the drying tower 20 where the comminuted solid materials are dried by the hot air in the drying tower and the drying mill 27, thus causing steam to be given off from the materials being dried. This steam is then circulated through the conduits 32, 35, 37 and 40 through the coil 62ᵇ. In this way, a quantity of steam is initially generated from the material being treated and after a comparatively short period of operation, this supply of steam becomes superheated and is recirculated continuously through the conduit 24, drying tower 20, drying mill 27 and conduits 32, 35, 37 and 40 so that when the circulation has once been established, the supply of air through the conduit 65 may be shut off, if desired, by turning the damper 69 and stopping the motor 66. In some cases, it may be desirable to continue the supply of air even after the circulation of superheated steam has been established. Since some steam is constantly being added to the superheated steam which is being circulated, due to the drying of the materials in the mill 27, it is necessary to dispose of the excess steam in the closed steam circulating sytem and this is preferably done by running a conduit 75 from the conduit 40, at the inlet end of the heating coil 62ᵇ, to the furnace chamber, a damper 76 being connected in this conduit to regulate the flow of steam to the furnace. In this way, the odor laden steam which is given off from the system is discharged into the furnace so that the odors are destroyed before any of the vapors or the like are vented to the atmosphere through the stack. If it be desired to vent this excess steam to the atmosphere, this can be done by closing the damper 76 and opening the damper 77 which is located in a vent pipe 78 connected to the pipe 75 above the damper 76. It will be observed that by this arrangement of apparatus, there is provided a method of treating waste materials according to which a portion of the solid material is dried in a single stage drying operation by being circulated through a drying circuit with the constant addition of wet material thereto and with the continuous discharge from this circulating system of a portion of dried material which is burned. At the same time, the major portion of the steam employed in effecting the drying operation is treated in a closed system with a continuous withdrawal of a portion of the steam in this system to be treated in the furnace or vented to the atmosphere.

Although one form of apparatus has been shown and described by way of illustration in connection with the explanation of one example of the improved method, it will be understood that the apparatus may be constructed in various other forms and that the method may be employed in various ways coming within the scope of the appended claims.

We claim:

1. The method of treating moisture-laden sewage waste and the like in a continuous process, which consists in comminuting and drying the solid material in the waste in the presence of superheated steam flowing in an endless circuit, separating the dried material from the steam, burning the dried material, utilizing the heat of combustion for heating the steam flowing in said circuit, and continuously withdrawing a portion of the steam from said circuit and subjecting said portion of withdrawn steam to the action of the gases of combustion.

2. The method of treating sewage waste and the like, which consists in continuously supplying wet waste materials, conveying said materials in an endless circulating drying circuit and subjecting them in said circuit to the action of a fluid including superheated steam, moving said fluid in an endless circuit which includes a part of said drying circuit, continuously withdrawing dried material from said first named circuit, burning said withdrawn dried material, and utilizing the heat of combustion for heating the fluid in said second named circuit.

3. The method of treating sewage waste and the like, which consists in continuously supplying wet waste materials, conveying said materials in an endless circulating drying circuit and subjecting them in said circuit to the action of a fluid including superheated steam, moving said fluid in a closed circuit which includes a part of said drying circuit, continuously withdrawing dried material from said first named circuit, burning said withdrawn dried material, utilizing the heat of combustion for heating the fluid in said second named circuit, and continuously withdrawing the fluid from said second named circuit and destroying the odors therein.

4. The combination in apparatus for disposing of sewage waste and the like, of means for preparing the solid materials in said waste for drying, means for conveying superheated steam to said prepared materials to effect the drying thereof, means for separating the dried materials from the steam, means for burning said dried materials, means for conveying the dried materials to said means for burning, a reheater, means for conveying the gases of combustion to said reheater, and means for passing said separated steam through said reheater and then to said second named means.

5. The combination in apparatus for disposing of sewage waste and the like, of means for preparing the solid materials in said waste for drying, means for conveying superheated steam to said prepared materials to effect the drying thereof, means for separating the dried materials from the steam, a furnace for burning said dried materials, means for conveying the dried materials to said furnace, a reheater, means for conveying the gases of combustion to said reheater, means for passing said separated steam through said reheater and then to said conveying means, and means for passing air through said reheater and then into the body of steam passing from said reheater.

6. The combination in apparatus for disposing of sewage waste and the like, of means for comminuting the solid materials in said waste, means for conveying superheated steam to said comminuted materials to effect the drying thereof, means for separating the dried materials from the steam, a furnace for burning said dried materials, means for conveying the dried materials to said furnace, a reheater, means for conveying the gases of combustion to said reheater, means for passing said separated steam through said reheater and then to said conveying means, means for passing air through said reheater and then into the body of steam passing from said reheater, and means for controlling said air supply.

7. The combination in apparatus for disposing of sewage waste and the like, of means for comminuting the solid materials in said waste, means for conveying superheated steam to said comminuted materials to effect the drying thereof, means for separating the dried materials from the steam, means for burning said dried materials, means for conveying the dried materials to said means for burning, a reheater, means for conveying the gases of combustion to said reheater, and means for passing said separated steam through said reheater and then to said separating means.

8. The combination in apparatus for disposing of sewage waste and the like, of means for comminuting the solid materials in said waste, means for conveying superheated steam to said comminuted materials to effect the drying thereof, means for separating the dried materials from the steam, a furnace for burning said dried materials, means for conveying the dried materials to said furnace, a reheater, means for conveying the gases of combustion to said reheater, means for passing said separated steam through said reheater and then to said conveying means, and means for passing air through said reheater and then into the body of steam passing from said reheater.

WILLIAM A. DUNDAS.
PHILIP HARRINGTON.